(12) United States Patent
Kamalaraj et al.

(10) Patent No.: US 8,594,014 B2
(45) Date of Patent: *Nov. 26, 2013

(54) SYSTEMS AND METHODS FOR SELECTING TRACKING AREAS AND REDUCING PAGING

(75) Inventors: Vinod Kamalaraj, Shirley, MA (US); Jacob Eipe, Nashua, NH (US)

(73) Assignee: Cisco Technology, Inc., San Jose, CA (US)

( * ) Notice: Subject to any disclaimer, the term of this patent is extended or adjusted under 35 U.S.C. 154(b) by 667 days.

This patent is subject to a terminal disclaimer.

(21) Appl. No.: 12/603,802

(22) Filed: Oct. 22, 2009

(65) Prior Publication Data

US 2011/0096721 A1    Apr. 28, 2011

(51) Int. Cl.
*H04W 4/00* (2009.01)

(52) U.S. Cl.
USPC ............................................. 370/328; 370/437

(58) Field of Classification Search
USPC ........................................ 370/252, 328, 437
See application file for complete search history.

(56) References Cited

U.S. PATENT DOCUMENTS

| | | | |
|---|---|---|---|
| 7,062,565 B1 | 6/2006 | Ravindranath et al. | |
| 7,136,469 B1 | 11/2006 | Ravindranath et al. | |
| 7,194,541 B1 | 3/2007 | Ravindranath et al. | |
| 7,774,483 B1 | 8/2010 | Ravindranath | |
| 7,881,208 B1 | 2/2011 | Nosella et al. | |
| 7,899,166 B1 | 3/2011 | Ravindranath et al. | |
| 8,068,846 B2 * | 11/2011 | Casati et al. | 455/456.1 |
| 8,243,680 B2 * | 8/2012 | Jung et al. | 370/331 |
| 8,275,392 B2 * | 9/2012 | Iwamura et al. | 455/456.1 |
| 2005/0068169 A1 * | 3/2005 | Copley et al. | 340/539.13 |
| 2007/0015548 A1 | 1/2007 | Flick | |
| 2007/0149217 A1 * | 6/2007 | Balachandran et al. | 455/456.1 |
| 2009/0042575 A1 * | 2/2009 | Voyer et al. | 455/436 |
| 2009/0052384 A1 | 2/2009 | Zisimopoulous et al. | |
| 2009/0181672 A1 | 7/2009 | Horn et al. | |
| 2009/0298471 A1 * | 12/2009 | He | 455/411 |
| 2009/0305699 A1 * | 12/2009 | Deshpande et al. | 455/434 |
| 2009/0305707 A1 | 12/2009 | Pudney | |
| 2010/0029298 A1 * | 2/2010 | Iwamura et al. | 455/456.1 |
| 2010/0069088 A1 | 3/2010 | Fischer | |
| 2010/0075698 A1 | 3/2010 | Rune et al. | |
| 2010/0220680 A1 | 9/2010 | Ramankutty et al. | |
| 2010/0227627 A1 * | 9/2010 | Ishii et al. | 455/456.2 |
| 2010/0263021 A1 | 10/2010 | Arnott et al. | |
| 2010/0267388 A1 | 10/2010 | Olsson | |
| 2010/0272115 A1 | 10/2010 | Ramankutty | |
| 2010/0281151 A1 | 11/2010 | Ramankutty et al. | |
| 2010/0281157 A1 | 11/2010 | Ramankutty et al. | |
| 2010/0299419 A1 | 11/2010 | Ramankutty et al. | |

(Continued)

*Primary Examiner* — Phuc Tran
(74) *Attorney, Agent, or Firm* — Wilmer Cutler Pickering Hale and Dorr LLP

(57) ABSTRACT

Some embodiments provide methods for selecting tracking areas in a network, including: generating and storing a plurality of tracking area groups based on which tracking areas of a plurality of tracking areas are served by which base transceiver stations of a plurality of base transceiver stations, each tracking area group including at least one tracking area; receiving a request for a tracking area list from user equipment connected to the network from a first tracking area belonging to a first tracking area group of the stored plurality of tracking area groups; based on the stored plurality of tracking area groups and the first tracking area group, generating a list comprising at least one tracking area; and sending the list comprising at least one tracking area to the user equipment.

20 Claims, 9 Drawing Sheets

(56) References Cited

U.S. PATENT DOCUMENTS

| | | |
|---|---|---|
| 2011/0013623 A1* | 1/2011 | Hu et al. .................. 370/355 |
| 2011/0035492 A1 | 2/2011 | Miyakawa |
| 2011/0075675 A1 | 3/2011 | Koodli et al. |
| 2011/0081043 A1* | 4/2011 | Sabol et al. ................ 382/103 |
| 2011/0096721 A1 | 4/2011 | Kamalaraj et al. |
| 2011/0096731 A1 | 4/2011 | Kamalaraj et al. |
| 2011/0098031 A1 | 4/2011 | Dakshayani et al. |
| 2011/0098051 A1 | 4/2011 | Kamalaraj et al. |
| 2011/0105153 A1 | 5/2011 | Miklos et al. |
| 2011/0165878 A1* | 7/2011 | Nylander et al. ............. 455/436 |
| 2011/0199937 A1 | 8/2011 | Demarez et al. |
| 2011/0210845 A1* | 9/2011 | Xiong et al. ............. 340/539.13 |
| 2011/0261715 A1 | 10/2011 | Norefors et al. |
| 2011/0261787 A1 | 10/2011 | Bachmann et al. |
| 2011/0314162 A1 | 12/2011 | Xu et al. |
| 2012/0026884 A1 | 2/2012 | Sundell et al. |
| 2012/0071173 A1 | 3/2012 | Olsson et al. |

* cited by examiner

| Name | TAI-A | TAI-B | TAI-C | TAI-D | TAI-E | TAI-F |
|---|---|---|---|---|---|---|
| TAI-A | 0 | 0.5 | 0.3 | 0 | 0 | 0.2 |
| TAI-B | 0.5 | 0 | 0 | 0.2 | 0 | 0.3 |
| TAI-C | 0.3 | 0 | 0 | 0.5 | 0 | 0.2 |
| TAI-D | 0 | 0.2 | 0.5 | 0 | 0.3 | 0 |
| TAI-E | 0 | 0 | 0 | 0.3 | 0 | 0.3 |
| TAI-F | 0.2 | 0.3 | 0.2 | 0 | 0.3 | 0 |

```
compute_TAI_list(node a){
    while (the number of chosen nodes < 16){
        choose a node b with the highest edge weight to node a {
            for any node pair (c, d) connected to node a through node b{
                edge_weight(c,d) += edge_weight(b,c) * edge_weight(b,d)
            }
            remove node b from the graph
        }
    }
}
```

| Name | TAI-A | TAI-C | TAI-D | TAI-E | TAI-F |
|---|---|---|---|---|---|
| TAI-A | 0 | 0.3 | 0.1 | 0 | 0.35 |
| TAI-C | 0.3 | 0 | 0.5 | 0 | 0.2 |
| TAI-D | 0.1 | 0.5 | 0 | 0.3 | 0.06 |
| TAI-E | 0 | 0 | 0.3 | 0 | 0.3 |
| TAI-F | 0.35 | 0.2 | 0.06 | 0.3 | 0 |

FIG. 8

| Name | TAI-A | TAI-C | TAI-D | TAI-E |
|---|---|---|---|---|
| TAI-A | 0 | 0.37 | 0.12 | 0.1 |
| TAI-C | 0.37 | 0 | 0.51 | 0.06 |
| TAI-D | 0.12 | 0.51 | 0 | 0.31 |
| TAI-E | 0.1 | 0.06 | 0.31 | 0 |

FIG. 9

| Name | TAI-A | TAI-D | TAI-E |
|---|---|---|---|
| TAI-A | 0 | 0.31 | 0.12 |
| TAI-D | 0.31 | 0 | 0.34 |
| TAI-E | 0.12 | 0.34 | 0 |

FIG. 10

| Tracking Area | eNBs supporting TA | Tracking Area Group |
|---|---|---|
| TAI-1 | eNB-A, eNB-B, eNB-C | TAG-A |
| TAI-2 | eNB-A | TAG-B |
| TAI-3 | eNB-B, eNB-C | TAG-C |
| TAI-4 | eNB-B, eNB-C | TAG-C |
| TAI-5 | eNB-A, eNB-B, eNB-C | TAG-A |
| TAI-6 | eNB-D | TAG-D |

FIG. 11

|  | TAG-A | TAG-B | TAG-C | TAG-D |
|---|---|---|---|---|
| TAG-A | 0 | 2 | 1 | 3 |
| TAG-B | 0 | 0 | 1 | 1 |
| TAG-C | 0 | 2 | 0 | 2 |
| TAG-D | 1 | 1 | 1 | 0 |

```
compute_TAI_list(TAI a){
    startTAG = TAG to which "a" belongs;
    TAI_list = all TAIs in startTAG;  — 1210
    While (TAI_list element count < 16){  — 1211
        newTAG = TAG with minimum weight from startTAG;  — 1212
        TAI_list += all TAIs in newTAG;  — 1213
        for all non-selected TAGs (otherTAG){
            edgeWeight from startTAG
                -= currentWeight – (num of eNBs in both newTAG and otherTAG)
        }
    }
}
```

FIG. 12

SYSTEMS AND METHODS FOR SELECTING TRACKING AREAS AND REDUCING PAGING

CROSS-REFERENCE TO RELATED APPLICATION

This application is related to U.S. patent applications titled "Systems and Methods for Selecting Serving Gateways to Service User Equipment," "Systems and Methods for Classifying User Equipment and Selecting Tracking Areas," "Systems and Methods for Reduced Latency Tracking Area Selection," and "Systems and Methods for Selecting Tracking Areas and Reducing Tracking Area Updates," each of which is being filed on the same day as this application and each of which is hereby incorporated by reference herein in its entirety.

TECHNICAL FIELD

The disclosed subject matter relates to systems and methods for selecting serving gateways and tracking areas to serve user equipment.

BACKGROUND

Wireless networks are telecommunications networks that use radio waves to carry information from one node in the network to one or more receiving nodes in the network. Wired communication can also be used in portions of a wireless network, such as between cells or access points. Cellular telephony is characterized by the use of radio cells that provide radio coverage for a geographic area, with multiple cells arranged to provide contiguous radio coverage over a larger area.

The first generation of wireless telephone technology used analog mobile phones in which analog information signals were transmitted. As technology progressed a second generation (2G) of wireless service was introduced. In 2G systems, digital information signals were used to modulate a carrier. These 2G technologies used time division multiplexed access (TDMA) or code division multiple access (CDMA) technologies to distinguish multiple users. Such networks that were upgraded to handle higher-speed packet data in networks referred to as 2.5G and 3G networks. The 3rd Generation Partnership Project (3GPP) and the 3rd Generation Partnership Project 2 (3GPP2) respectively developed the GSM/UMTS/HSDPA and cdmaOne/CDMA2000 technologies. The next evolution is 4G technology, which is referred to as long term evolution-system architecture evolution (LTE-SAE) and uses orthogonal frequency division multiple access (OFDMA) technology.

Other wireless protocols have also developed including WiFi, an implementation of various IEEE 802.11 protocols, WiMAX, an implementation of IEEE 802.16, and HiperMAN, which is based on an ETSI alternative to IEEE 802.16.

Wireless communication technologies are used in connection with many applications, including, for example, satellite communications systems, portable digital assistants (PDAs), laptop computers, and user equipment (e.g., cellular telephones, mobile phones equipment). One benefit that users of such applications can obtain is the ability to connect to a network (e.g., the Internet) as long as the user is within range of such a wireless communication technology.

SUMMARY

Some embodiments of the disclosed subject matter provide reduced latency systems and methods for selecting serving gateways to serve user equipment. Some embodiments of the disclosed subject matter provide reduced latency systems and methods for generating user equipment's tracking area identity lists. Some embodiments of the disclosed subject matter provide systems and methods for generating user equipment's tracking area identity lists based on, for example, one or more of the user equipment's paging load, tracking area update load, and mobility characteristics.

Some embodiments provide methods for selecting tracking areas in a network, including: generating and storing a plurality of tracking area groups based on which tracking areas of a plurality of tracking areas are served by which base transceiver stations of a plurality of base transceiver stations, each tracking area group including at least one tracking area; receiving a request for a tracking area list from user equipment connected to the network from a first tracking area belonging to a first tracking area group of the stored plurality of tracking area groups; based on the stored plurality of tracking area groups and the first tracking area group, generating a list comprising at least one tracking area; and sending the list comprising at least one tracking area to the user equipment.

Some embodiments provide a mobility management entity in a communication network including a first interface configured to store a plurality of tracking area groups based on which tracking areas of a plurality of tracking areas are served by which base transceiver stations of a plurality of base transceiver stations, each tracking area group including at least one tracking area; and receive a request for a tracking area list from user equipment connected to the network from a first tracking area belonging to a first tracking area group of the stored plurality of tracking area groups; the mobility management entity configured to: based on the stored plurality of tracking area groups and the first tracking area group, generate a list comprising at least one tracking area; and; the first interface further configured to sending the list comprising at least one tracking area to the user equipment.

BRIEF DESCRIPTION OF THE DRAWINGS

FIG. 6 illustrates a method for allocating a tracking area identity list to user equipment based on the graph of FIG. 4 or matrix of FIG. 5 in accordance with some embodiments of the disclosed subject matter.

FIGS. 7-9 are adjacency matrixes that are generated as the method of FIG. 6 is applied to the adjacency matrix of FIG. 5.

FIG. 10 illustrates a table identifying tracking areas, the evolved nodeBs that support those tracking areas, and the tracking area group to which each tracking area belongs in accordance with some embodiments of the disclosed subject matter.

FIG. 11 illustrates a directed adjacency matrix for interconnecting the tracking areas of FIG. 10.

FIG. 12 illustrates a method for allocating a tracking area identity list to user equipment based on the table of FIG. 10 and matrix of FIG. 11 in accordance with some embodiments of the disclosed subject matter.

DETAILED DESCRIPTION

Figure 1:
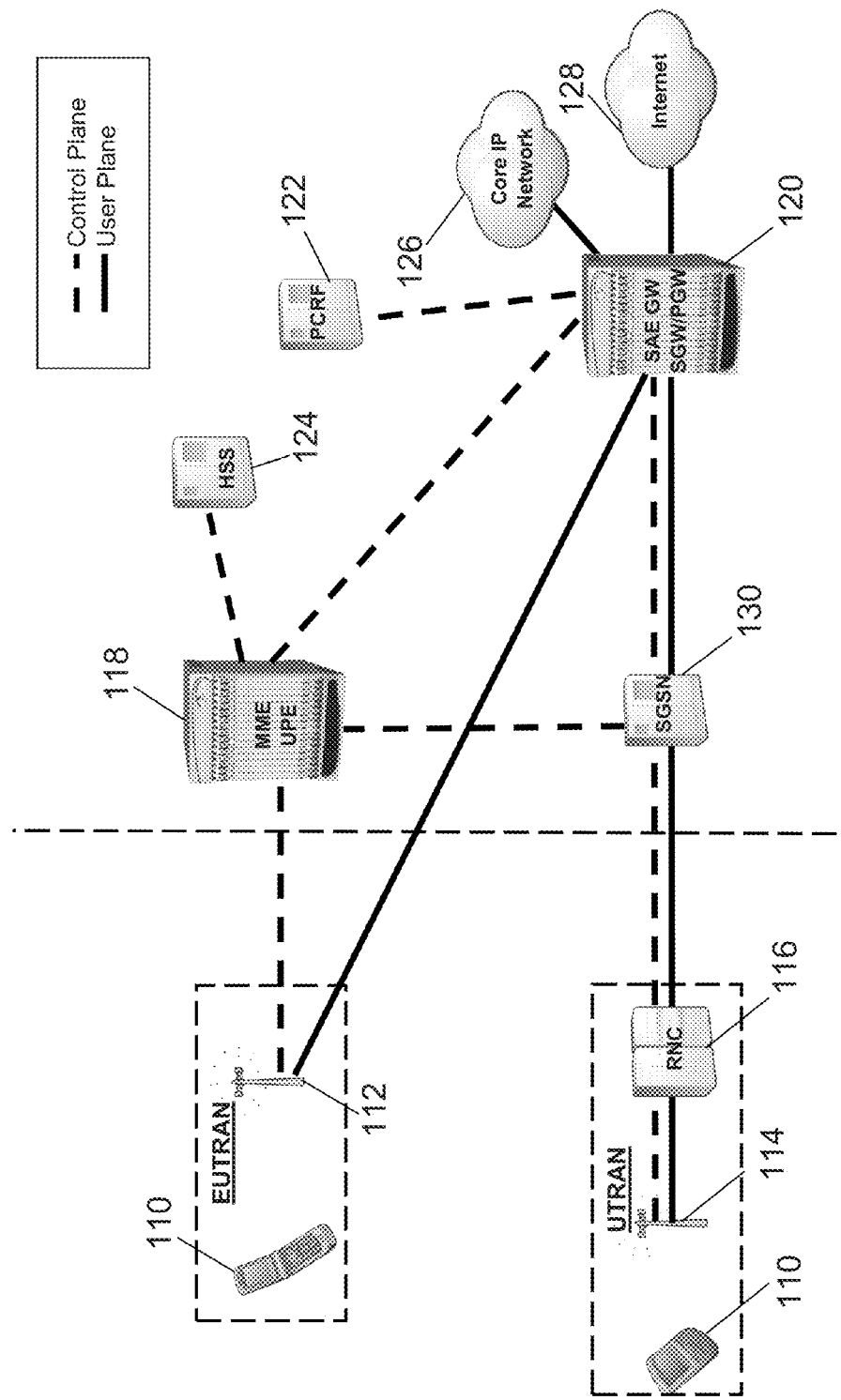
FIG. 1 illustrates a long term evolution (LTE) network in accordance with some embodiments of the disclosed subject matter.

FIG. 1 illustrates a long term evolution (LTE) network and a universal mobile telecommunication system (UMTS) release 8 network. The network diagram of FIG. 1 includes user equipment (UE) 110, an evolved nodeB (eNB) 112, a nodeB 114, a radio network controller (RNC) 116, a mobility management entity (MME)/user plane entity (UPE) 118, a system architecture evolution gateway (SAE GW) 120, a policy and charging rules function (PCRF) 122, home subscriber server (HSS) 124, core IP network 126, internet 128, and Serving General packet radio service Support Node (SGSN) 130. The MME 118, SAE GW 120, and SGSN 130 can be implemented in a chassis as described below. The SAE GW 120 can include a serving gateway (S-GW) as well as a packet data network gateway (P-GW). In some embodiments, the S-GW and P-GW can be implemented on separate network devices.

MME 118 is a control-node for the LTE access network. The MME 118 is responsible for UE 110 tracking and paging procedures including retransmissions. MME 118 handles the bearer activation/deactivation process and is also responsible for choosing the S-GW for a UE 110 at the initial attach and at time of an intra-LTE handover. The MME 118 authenticates the user by interacting with the HSS 124. The MME 118 generates and allocates temporary identities to UEs and terminates Non-Access Stratum (NAS) signaling. The MME 118 checks the authorization of the UE 110 to camp on the service provider's Public Land Mobile Network (PLMN) and enforces UE roaming restrictions. The MME 118 is the termination point in the network for ciphering/integrity protection for NAS signaling and handles the security key management. Lawful interception of signaling is also supported by the MME 118. The MME also provides the control plane function for mobility between LTE and 2G/3G access networks with the S3 interface terminating at the MME 118 from the SGSN 130. The MME 118 also terminates the S6a interface towards the home HSS for roaming UEs.

The S-GW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PDN GW). For idle state UEs, the S-GW terminates the down link data path and triggers paging when down link data arrives for the UE 110. The S-GW manages and stores UE contexts, e.g., parameters of the IP bearer service and network internal routing information. The S-GW also performs replication of the user traffic in case of lawful interception. The P-GW provides connectivity to the UE 110 to external packet data networks by being the point of exit and entry of traffic for the UE 110. A UE 110 may have simultaneous connectivity with more than one P-GW for accessing multiple packet data networks. The P-GW performs policy enforcement, packet filtering for each user, charging support, lawful interception, and packet screening. The P-GW also provides an anchor for mobility between 3GPP and non-3GPP technologies such as WiMAX and 3GPP2 (CDMA 1X and EvDO). The S-GW or the PGW depending on the embodiment, can be used to provide deep packet inspection and provide advertising to the user on a per subscriber basis as described above on a chassis implementing a S-GW or a PGW.

Tracking Area Lists and Paging

Figure 2:
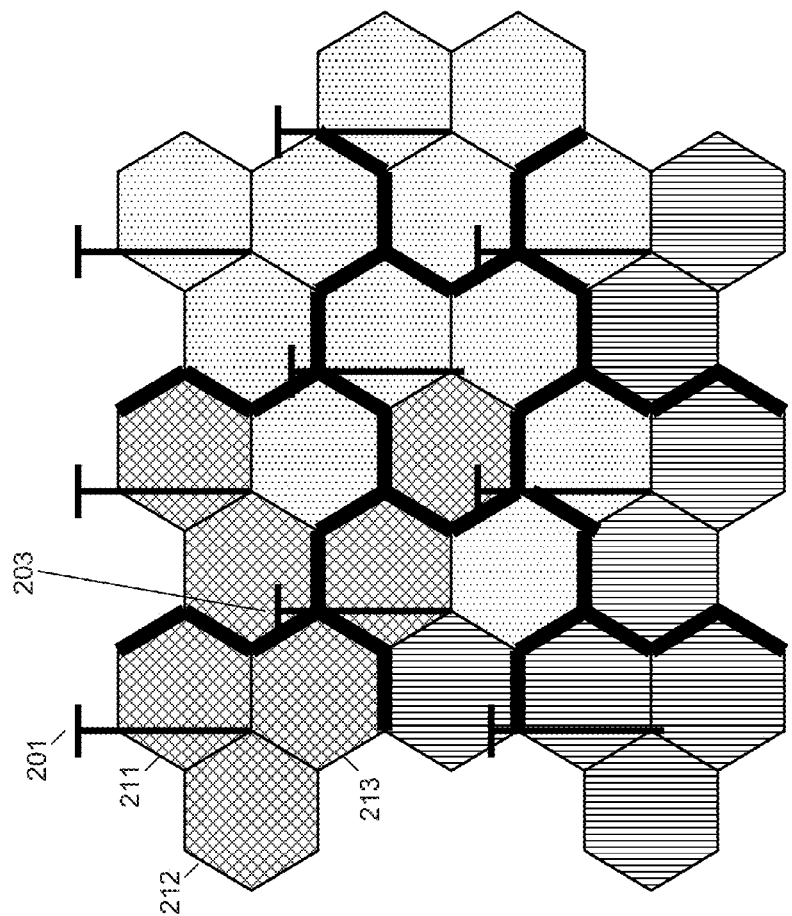
FIG. 2 illustrates relationships between cells, tracking areas, and evolved nodeBs in accordance with some embodiments of the disclosed subject matter.
Figure 2:
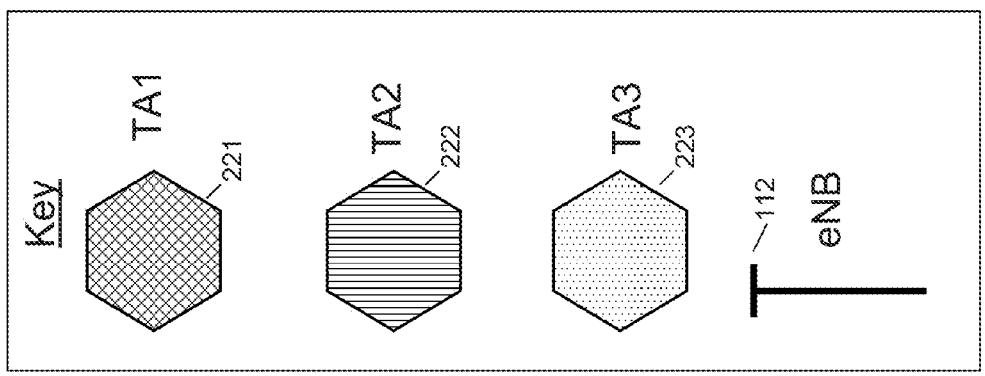

A radio tower is logically located between user equipment 110 and eNB 112. One or more such radio towers provide wireless coverage to an area known as a cell. Logical grouping of these cells can form tracking areas, for example, that define a boundaries used for paging, roaming restrictions, etc. Each hexagon of FIG. 2 represents a cell.

Each of the three different fill types of the cells identifies the tracking area in which the cell is located. While each cell is part of only one tracking area, an eNB 112 can serve cells belonging to different tracking areas. FIG. 2 illustrates nine eNBs 112, each serving the three cells immediately surrounding a particular eNB 112 (as grouped by the think black lines). For example, eNB 201 serves cells 211, 212, and 213. The nine eNBs are located within three tracking areas (tracking areas 221, 222, and 223). eNB 201, for example, has cells belonging only to tracking area 221. eNB 203, for example, has cells belonging to all three tracking areas.

When eNB 203, for example, connects to an MME 118, it sends MME 118 tracking area identities for each of tracking areas 221, 222, and 223. A tracking area identity (TAI) is used to identify a tracking area, and is constructed from the MCC (Mobile Country Code), MNC (Mobile Network Code), and TAC (Tracking Area Code). A UE 112 can store a list of tracking area identities ("TAI list") identifying which tracking areas it is served by. The TAI list can be assigned or updated by an MME 118 when, for example, the UE 110 connects to a network, on a periodic basis, or when the UE detects is has entered a tracking area not in its TAI list and sends a tracking area update ("TAU").

A UE 110 can receive a page request, for example, to notify the UE that another device (e.g., another UE, a landline phone, etc) is trying to call the UE or to alert the UE that another device is attempting to send the UE packet data. For example, data can be received at S-GW 120 from a remote device. S-GW 120 can generate and send a page request to MME 118 to locate and establish communications with a UE 110. In response, MME 118 can send a page to eNBs 112 in the tracking area where the target UE 110 was last known to be located. If the UE 110 receives the page request, the UE can send a paging response to the MME 118 and a process of, e.g., exchanging data or setting up a call, can continue.

An MME 118 can assign a TAI list to a UE based on, among other things, for example, the UE's TAU load and/or paging load. Various embodiments of the disclosed subject matter provide systems and methods for assigning TAI lists to a UE 112. For low mobility devices, for example, the assigned TAI list can be generated such that the number of associated eNBs 112 is reduced. This can reduce unnecessary paging that can result from, for example, paging too many eNBs even though a low mobility device (e.g., an at-home device) may almost always be serviced by the same eNB 112. For high mobility, low paged devices, (e.g., in-vehicle security devices), for example, the assigned TAI list can be generated to be associated with a large number of eNBs 112. Because high mobility, low paged devices are rarely paged, few network resources are wasted by paging a large TAI list. Instead, the focus of assigning a TAI list can be on reducing the number of tracking area updates, which can tend to occur frequently when a high mobility device has a small TAI list. For high mobility, high paged devices, for example, reaching a balance between reducing paging load and reducing tracking area updates can be the focus of assigning a TAI list. In addition, eNBs belonging to a same tracking area typically have connectivity to a same S-GW. Various embodiments of the disclosed subject matter provide systems and methods for selecting an S-GW 120 to serve a UE 110.

Reducing Latency for S-GW Selection

An MME 118 is responsible for selecting an S-GW 120 that services the tracking area from which a UE 110 is connecting. For example, when a UE 110 sends an Attach Request to an eNB 112, the eNB 112 passes this request to an MME 118, which selects an S-GW 120 to service the UE 110. 3GPP standards specify that domain name system (DNS) based mechanisms be used to determine which S-GWs can serve a particular tracking area. For example, the list of S-GWs servicing a tracking area can be obtained by performing a DNS resolution using a TAI fully qualified domain name. Some embodiments reduce latency that can be caused by determining which S-GWs can serve a particular tracking area.

Figure 3:
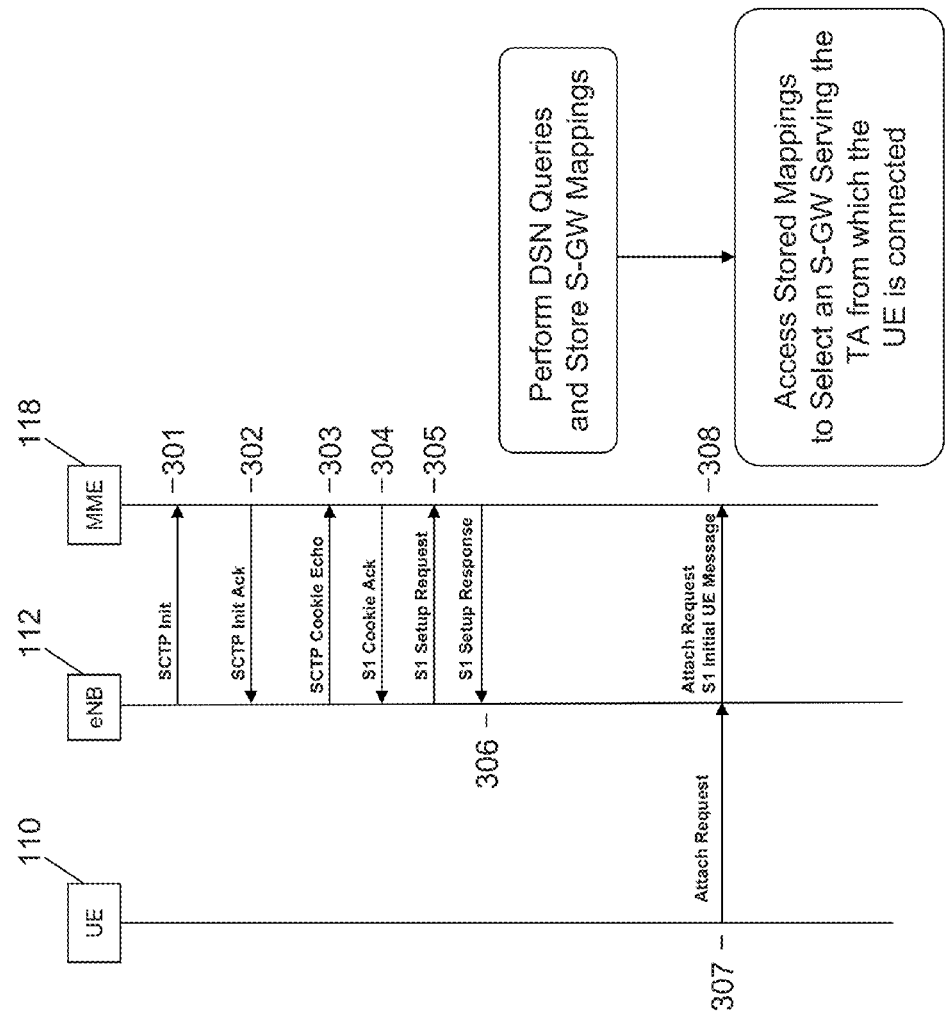
FIG. 3 illustrates a method for selecting a serving gateway to service user equipment in communication with a network in accordance with some embodiments of the disclosed subject matter.

Referring to FIG. 3, when an eNB 112 connection is established to an MME 118, S1 SETUP messages are exchanged for S1 connection initialization. These messages, exchanged between an eNB 112 and an MME 118, are illustrated as messages 301-306 in FIG. 3. S1 Setup Request 306 includes a list of tracking areas handled by eNB 112 (for example, referring to FIG. 2, only TA1 if eNB 201). The MME 118 can use this list of tracking areas to perform DNS queries to obtain and store TAI to S-GW mappings. Later, the stored mappings can be used for S-GW selection, for example, during a UE Attach procedure, Tracking area update procedure, etc. For example, Attach Request message 307 from UE 110 to eNB 112 results in eNB 112 sending Attach Request 308 to MME 118. MME 118 can select an S-GW from its locally stored list of S-GWs, handled by this particular eNB 112 and serving the tracking area from which the particular eNB 112 is connected. In addition, to address changes in the DNS server, an MME 118 can use timers to periodically refresh its locally stored TAI to S-GW mappings.

Table 1 below illustrates and example structure of TAI to S-GW mappings.

TABLE 1

| TAI-1 | S-GW1 | |
|---|---|---|
| TAI-2 | S-GW4 | S-GW2 |
| TAI-3 | S-GW2 | |
| TAI-4 | S-GW1 | S-GW3 |

The information can be stored in an MME 118 and indicates, for example, that tracking area TAI-2 is served by S-GW4 and S-GW2.

Reducing Latency for TAI List Generation

In assigning a TAI list to a UE 110, the MME can ensure that tracking areas in its assigned TAI list are serviced by the S-GW servicing the UE. Whether a given S-GW services a particular tracking area can be determined by performing a DNS resolution using a TAI fully qualified domain name. However, doing so for every TAI in a TAI list during list allocation can result in undesired latency. For example, to reduce latency for TAI list allocation in an LTE/SAE network, some embodiments perform DNS queries as a result of eNB 112 setup.

During processing of an S1 SETUP Request or NAS Attach Request, an MME 118 can perform DNS queries to determine which S-GWs service which tracking areas. The MME 118 can use this information to generate and locally store the list of TAIs serviced by each S-GW. For example, with reference to Table 2, an MME 118 can store information indicating that TAI-1, TAI-2, TAI-3, and TAI-4 are served by S-GW1

TABLE 2

| S-GW1: | TAI-1 | TAI-2 | TAI-3 | TAI-4 |
|---|---|---|---|---|
| S-GW2: | TAI-11 | TAI-12 | TAI-13 | TAI-14 |

When a UE 110 initiates an Attach Request, the list of TAI associated with the same S-GW as the tracking area where the UE is located can be used as the set from which to select the tracking area list to be sent to the UE. For example, when a UE 110 initiates an Attach Request, from, for example, TAI-2, the MME 118 can access the information illustrated in Table 2 to determine that TAI-2 is serviced by S-GW1, and that S-GW-1 also services TA-1, TAI-3, and TAI-4. The TAI's for the TAI list to be allocated to the UE 112 can be selected from the set of TA-1, TAI-2, TAI-3, and TAI-4, and this can be done without needing to, for example, perform any DNS queries in response to the Attach Request. In addition, to address changes in the DNS server, an MME 118 can use timers to periodically refresh the locally stored information identifying associations between TAI and S-GWs.

Some embodiments combine reduced latency for S-GW selection and reduced latency for TAI list allocation. For example, when an MME 118 receives an Attach Request from a UE 110 via an eNB 112, the MME can use locally stored TAIs to S-GW mappings to select an S-GW serving the tracking area from which the UE is connected, and can use locally stored S-GW to TAI mappings to determine a set of TAIs from which to allocate a tracking area list for the UE, after receiving an attach request.

Reducing Tracking Area Updates

If the TAI list assigned to a UE was not, for example, generated using appropriate characteristics regarding the UE's movements, the UE can find itself frequently in tracking areas that are not in its assigned TAI list. This can lead to the UE sending a high number of TAUs and wasting radio resources and UE and network computing power. For example, a cellular phone may move from (referring to FIG. 2) TA-3 to TA-2. If, for example, TA-2 is not in the cellular phone's tracking area list, the phone can send a tracking area update to an eNB 112. This tracking update will identify the current tracking area (i.e., TA-2) and the last tracking area visited (i.e., TA-3). To reduce TAUs, some embodiments manage a TAI list by identifying particular tracking areas to which a UE is likely to move.

Some embodiments use the identity of last TAI visited, which is included in Attach Requests and TAUs, to predict which tracking area a UE will move to. An MME 118 can maintain a per S-GW serving area graph. An S-GW serving area can be a group of tracking areas that are served by an S-GW. There can be, for example, multiple S-GWs serving an S-GW serving area. The nodes of the graph represent TAIs within the S-GW serving area. A Node(i) is connected to Node(j). When a tracking area update or attach request is received at an MME, the current TAI (j) and Last visited TAI (i) are monitored and an edge (i, j) is given a weight equal to the total number of such requests received. The total number of TAUs and Attach Requests received at each node is also stored. Then the weight of an edge (i,j) is equal to its number of request divided by the total number of request. For example, for a TAI-A: if there were ten total request and five of them were (B,A) then the graph for TAI-A would include an edge between node TAI-A to TAI-B with a weight of 0.5 (i.e., 5/10).

Figures 4, 5:
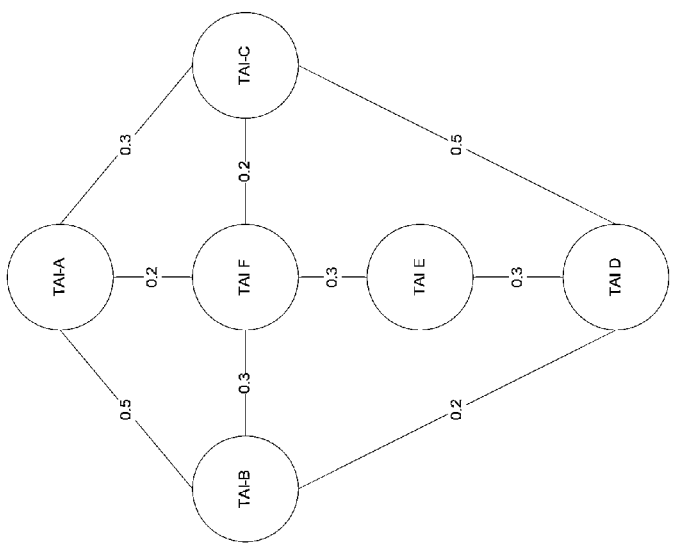
FIG. 4 illustrates a graph of nodes representing tracking areas connected by weighted edges representing movement of user equipment between the tracking areas in accordance with some embodiments of the disclosed subject matter.
FIG. 5 is an adjacency matrix describing the graph of FIG. 4

A sample graph and corresponding weighed adjacency matrix are shown in FIGS. 4 and 5. As shown in the graph and adjacency matrix, for example, the edge between the node for TAI-A and TAI-B has a weight of 0.5 indicating that half of the UEs that moved out of TAI-A, from the S-GW serving area for which FIG. 4 pertains, moved to TAI-B. Similarly, twenty percent moved to TAI-F and twenty percent moved to TAI-C. In the example of FIG. 4, the probability of moving between two nodes in either direction is the same. For example, changes from (1) TAI-A to TAI-B; and (2) TAI-B to TAI-A both have the same probability (i.e., 50%). Other embodiments, for example, can include two oppositely directed edges between each pair of nodes indicating different probabilities based on the direction of movement.

A TAI list can be computed using the method illustrated in FIG. 6. Starting from the adjacency matrix of FIG. 5, the TAI with maximum priority is selected (TAI-B). Then, the weights between all the nodes to which TAI-B is connected are updated. Using W(A,D) as an example, W(A,B), which is 0.5, is multiplied by W(B,D), which is 0.2, to obtain 0.1. Then, 0.1 is added to the current W(A,D), which as shown by node A not being directly connected to node D (or by the adjacency matrix of FIG. 5), is 0; 0+0.1 equals 0.1, hence: {W(A,D)+=0.1 (0.5×0.2), new weight=0.1}}. The updated weights for node A's remaining neighbors are calculated as: {W(A,F)+=0.15 (0.5×0.3), new weight=0.35}} and {W(D, F)+=0.06 (0.2×0.3), new weight=0.06}. After removing node TAI-B and updating the weights of the various nodes, the adjacency matrix of FIG. 7 is produced.

As shown, the edge between TAI-A and TAI-F has the highest value among the edges from TAI-A. As such, TAI-F is added to the TAI list, and the update weights are calculated: {W(A,C)+=0.07 (0.35×0.2), new weight=0.37}; {W(A,D)+= 0.02 (0.35×0.06), new weight=0.12}; {W(A,E)+=0.10 (0.35×0.3), new weight=0.10}; {W(C,D)+=0.01 (0.2×0.06), new weight=0.511; {W(C,E)+=0.06 (0.2×0.3), new weight=0.06}; and {W(D,E)+=0.01 (0.06×0.3), new weight=0.3}}. After removing TAI-F and updating the weights, the adjacency matrix of FIG. 8 is produced.

As shown, the edge between and TAI-A and TAI C has the highest value among the edges from TAI-A. As such, TAI-C is added to the TAI, and the update weights are calculated: {W(A,D)+=0.19 (0.37×0.51), new weight=0.31}; {W(A, E)+= 0.02 (0.37×0.06), new weight=0.12}; and {W(D,E)+= 0.03 (0.51×0.06), new weight=0.34}. After removing TAI-C and updating the weights, the adjacency matrix of FIG. 8 is produced. TAI-D and TAI-E can then be added to the TAI list based on their respective weights in relation to TAI-A.

In the above example, the total number of TAIs was less than sixteen to begin with, so in some embodiments the entire method would have been skipped. However, for ease of explanation, a graph of only six nodes was used. In addition, various embodiments can use different values for the maximum number of nodes to be added to the TAI list, based on, for example, whether the UE's characteristics (e.g., high paging, low paging, high mobility, low mobility, etc.).

Reducing Paging

An MME 118 provides paging to UEs 110. An MME 118 is specified to send a page to all eNBs in a tracking area where the target UE was last registered. This can lead to a page being sent to a number of eNBs and subsequently being transmitted over the paging channel by a number of eNBs to find the target UE. If a tracking area assigned to a UE is covered by a multitude of eNBs, when the network needs to page the UE, all the eNBs will be paged. This paging can waste radio resources and network computing capacity. To reduce such a waste of resources, some embodiments provide improved paging, through TAI list management, by limiting paging to a reduced set of eNBs.

An MME 118 can assign tracking areas to Tracking Area Groups (TAGs). Each tracking area in a TAG can be supported by the same set of eNBs. Edge weighted directed graphs of TAGs can be created, with two edges in opposite directions between two nodes. The edge weight w of an edge from TAG(i) to TAG(j) is the number of EnodeBs in TAG(j) but not in TAG(i). For example, if TAG(A) consisted of EnodeB-1, EnodeB-2, and EnodeB-3; and if TAG(B) consisted of EnodeB-3 and EnodeB-4, then the edge from TAG(A) to TAG(B) would have a weight of one (because TAG(B) includes EnodeB-4, which is not included in TAG(A)). Using the same example, the edge from TAG(B) to TAG(A) would be two (because TAG(A) includes EnodeB-1 and EnodeB-2, which TAG(B) does not). Thus, if the set of eNBs in TAG(i) is a subset of those in TAG(j), the weight from TAG(j) to TAG(i) is set to 0. The minimum weight of any edge is 0.

An example table is illustrated in FIG. 10 including columns of tracking areas 1010, eNBs supporting those tracking areas 1020, and tracking area groups 1030. For example, TAI-1 is supported by eNB-A, eNB-B, and eNB-C, and TAI-1 is in tracking area group TAG-A. FIG. 11 illustrates the directed adjacency matrix for FIG. 10, where the directions of edges go from columns 1110 to rows 1120. For example, the edge from TAG-A to TAG-B has a weight of zero, and the edge from TAG-B to TAG-A has a weight of two.

A TAI list can be computed using the method illustrated in FIG. 12. For example, using the data of FIGS. 10 and 11, if an ATTACH request is received from a UE 110 in TAI-1, TAI-5 is first added to the UE's TAI list, because TAI-5 and TAI-1 belong to the same TAG (1210 of FIG. 12). Then, the method can enter the while loop, at 1211. And, TAG-C can be selected, at 1212, because it has minimal weight (in this example TAG-B and TAG-C have the same weight, so the tracking area with a higher number of TAIs can be selected between the two; in this case TAG-C has two and TAG-B has only one). TAI-3 and TAI-4 are thus added to the TAI list, at 1213 because they the members of TAG-C. Then, in loop 1214, TAG-B is selected, adding TAI-2 to the TAI list, then TAG-D is selected and TAI-6 is added.

Device Categorization

As discussed, an MME 118 can assign a TAI list to a UE based on, among other things, for example, the UE's tracking area update ("TAU") load and/or paging load. For example, the method described in FIG. 6 is related to reducing tracking area updates by reducing the number of TAIs included a UE's TAI list, and the method described in FIG. 12 is related to reducing paging load by, for example, reducing the number of eNBs 112 that are paged when a network pages a UE. Also as discussed above, UE's can be classified into various categories, including (1) low mobility devices; (2) high mobility, low paged devices; and (3) high mobility, high paged devices. Some embodiments can categorize a device into one of these categories, and based on its categorization, select a method or combination of methods to use for generating the UE's TAI list.

Figure 13:
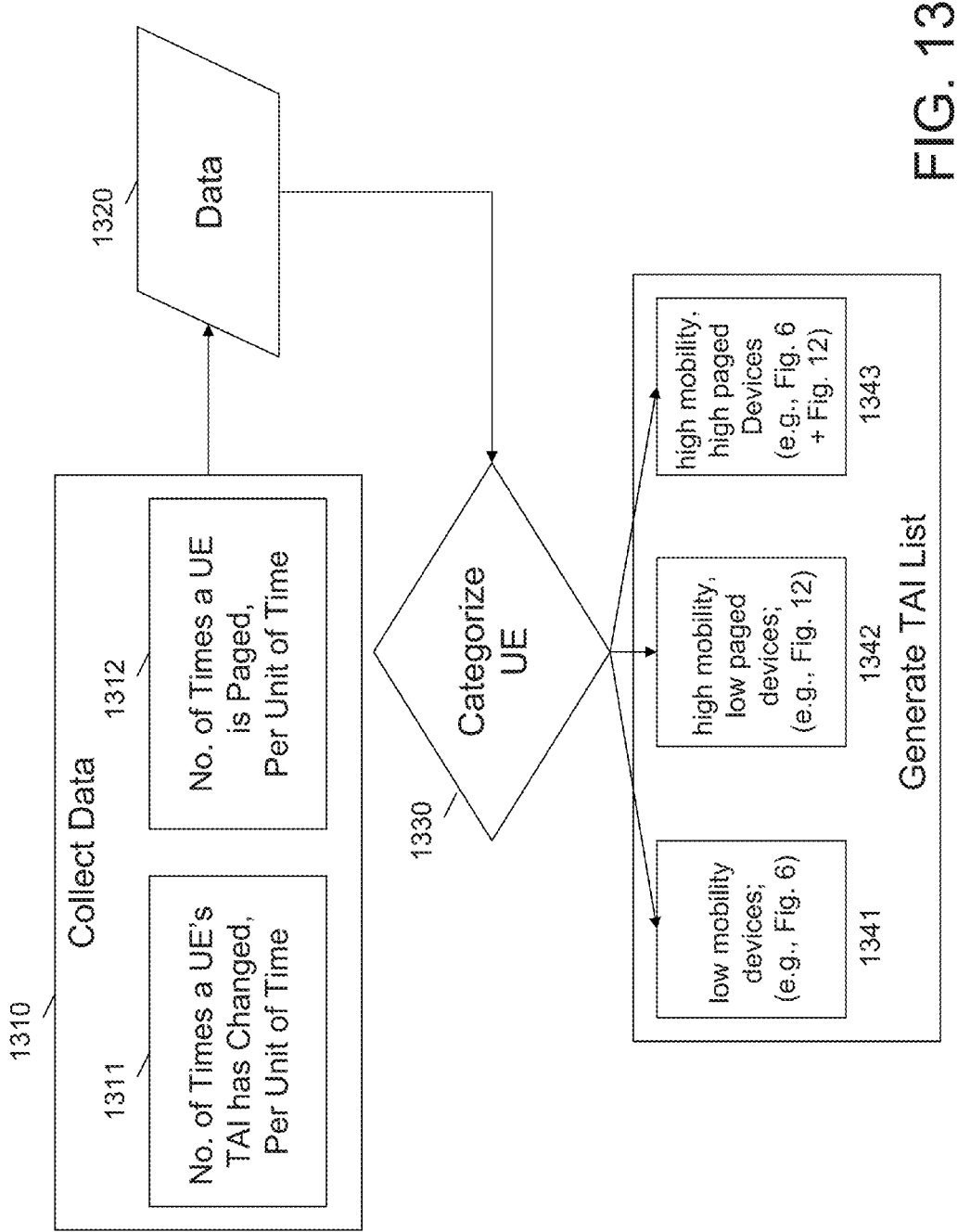
FIG. 13 illustrates a method of collecting data describing user equipment related behavior, classifying user equipment based on the behavior, and allocating a tracking area identity list to user equipment based on the classification in accordance with some embodiments of the disclosed subject matter.

At 1310 of FIG. 13, for example, an MME 118 can collect data useful for UE categorization. The collected data can include, for example, the number of times the UE's TAI has changed per unit of time 1311. This number can be determined based on the S1 messages exchanged between a UE and a network that include the current TAI of the UE. The collected data can also include, for example, the number of times a UE is paged per unit of time. The collected data can be stored in MME as collected data 1320.

Based on collected data 1320, a UE can be categorized, at 1330, into for example, one of the three categories described above, and a TAI list can be generated using method 1341, 1342, or 1343. Regarding, method 1343, for example, the methods described in FIGS. 6 and 12 can be combined in various ways, such as, (1) using both and then selecting only TAIs that appear each of the two generated TAI lists; (2) using the output of one method as input to another; (3) using both methods, weighing the results based how mobile and/or how high paging the device is, to select some of the TAIs identified in the two generated lists; (4) various combinations of (1)-(3), etc.

Other Example Embodiments

The various methods described herein, for example, identify S-GWs or generate TAI lists can be combined with various other methods. For example, the TAI lists generated by the methods described herein are not necessarily the TAI lists allocated to user equipment. Instead, the generated TAI lists can be, for example, used as starting point for other methods to further process before being allocated to user equipment. Accordingly, a tracking area list for a user equipment device, for example, can be, but is not limited to, a tracking area list allocated to a user equipment device, a tracking area list that is used as input to additional methods, a tracking area list that is generated to include a subset of TAIs generated by other methods, or a tracking area list that is not allocated to a user equipment device.

Various embodiments of the disclosed subject matter can be implemented using, and combined with, subject matter described in, for example, 3GPP TS 23.401, 3rd Generation Partnership Project; Technical Specification Group Services and System Aspects; General Packet Radio Service (GPRS) enhancements for Evolved Universal Terrestrial Radio Access Network (E-UTRAN) access (Release 9), and related specification currently available from the 3rd Generation Partnership Project (3GPP) at http://www.3gpp.org. However, various embodiments can also be implemented using, and combined with, for example, systems, networks, devices, protocols, and standards different than described by these specifications.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways within the scope and spirit of the invention.

What is claimed is:

1. A method for selecting tracking areas in a network, comprising:
generating and storing a plurality of tracking area groups based on which tracking areas of a plurality of tracking areas are served by which base transceiver stations of a plurality of base transceiver stations, each tracking area group including at least one tracking area;
receiving a request for a tracking area list from user equipment connected to the network from a first tracking area belonging to a first tracking area group of the stored plurality of tracking area groups;
based on the stored plurality of tracking area groups and the first tracking area group, generating a list comprising at least one tracking area; and
sending the list comprising at least one tracking area to the user equipment.

2. The method of claim 1, wherein one of the plurality of tracking area groups includes at least two tracking areas, and wherein each of the at least two tracking areas are served by a same one of base transceiver stations.

3. The method of claim 1, further comprising:
adding each tracking area in the first tracking area group to the list including at least one tracking area;
selecting a second tracking area group based on an overlap of tracking areas between the first tracking area group and the second tracking area group; and
adding each tracking area in the second tracking area group to the list including at least one tracking area.

4. The method of claim 1, further comprising:
generating and storing an edge weighted directed graph of nodes corresponding to the tracking area groups, each node connected to at least one other node by two oppositely directed edges assigned weights based on an overlap of tracking areas between two such interconnected nodes.

5. The method of claim 4, further comprising:
adding tracking areas to the list including at least one tracking area based on the edge weighted directed graph.

6. The method of claim 1 wherein a base transceiver station includes an evolved nodeB.

7. The method of claim 1, the request for a tracking area list including one of an attach message and a tracking area update.

8. A mobility management entity in a communication network comprising:
a first interface configured to store a plurality of tracking area groups based on which tracking areas of a plurality of tracking areas are served by which base transceiver stations of a plurality of base transceiver stations, each tracking area group including at least one tracking area; and,
receive a request for a tracking area list from user equipment connected to the network from a first tracking area belonging to a first tracking area group of the stored plurality of tracking area groups;
the mobility management entity configured to: based on the stored plurality of tracking area groups and the first tracking area group, generate a list comprising at least one tracking area; and;
the first interface further configured to sending the list comprising at least one tracking area to the user equipment.

9. The mobility management entity of claim 8, wherein one of the plurality of tracking area groups includes at least two tracking areas, wherein each of the at least two tracking areas are served by a same one of base transceiver stations.

10. The mobility management entity of claim 8, the mobility management entity further configured to:
add each tracking area in the first tracking area group to the list including at least one tracking area;
select a second tracking area group based on an overlap of tracking areas between the first tracking area group and the second tracking area group; and
add each tracking area in the second tracking area group to the list including at least one tracking area.

11. The mobility management entity of claim 8, the mobility management entity further configured to:
generate and store an edge weighted directed graph of nodes corresponding to the tracking area groups, each node connected to at least one other node by two oppositely directed edges assigned weights based on an overlap of tracking areas between two such interconnected nodes.

12. The mobility management entity of claim 11, the mobility management entity further configured to:
add tracking areas to the list including at least one tracking area based on the edge weighted directed graph.

13. The mobility management entity of claim 8 wherein a base transceiver station includes an evolved nodeB.

14. The mobility management entity of claim 8, the request for a tracking area list including one of an attach message and a tracking area update.

15. A non-transitory computer readable media comprising logic that is, when executed, configure to:
generate and store a plurality of tracking area groups based on which tracking areas of a plurality of tracking areas are served by which base transceiver stations of a plurality of base transceiver stations, each tracking area group including at least one tracking area;
receive a request for a tracking area list from user equipment connected to the network from a first tracking area belonging to a first tracking area group of the stored plurality of tracking area groups;
based on the stored plurality of tracking area groups and the first tracking area group, generate a list comprising at least one tracking area; and
send the list comprising at least one tracking area to the user equipment.

16. The non-transitory computer readable media of claim 15, wherein one of the plurality of tracking area groups includes at least two tracking areas, wherein each of the at least two tracking areas are served by a same one of base transceiver stations.

17. The non-transitory computer readable media of claim 15, further comprising logic, when executed, configured to:
add each tracking area in the first tracking area group to the list including at least one tracking area;
select a second tracking area group based on an overlap of tracking areas between the first tracking area group and the second tracking area group; and
add each tracking area in the second tracking area group to the list including at least one tracking area.

18. The non-transitory computer readable media of claim 15, further comprising logic, when executed, configured to:
generate and store an edge weighted directed graph of nodes corresponding to the tracking area groups, each node connected to at least one other node by two oppositely directed edges assigned weights based on an overlap of tracking areas between two such interconnected nodes.

19. The non-transitory computer readable media of claim 18, further comprising logic, when executed, configured to:
add tracking areas to the list including at least one tracking area based on the edge weighted directed graph.

20. The non-transitory computer readable media of claim 15, wherein a base transceiver station includes an evolved nodeB.

* * * * *